US008522719B2

(12) United States Patent
Feld

(10) Patent No.: US 8,522,719 B2
(45) Date of Patent: Sep. 3, 2013

(54) PORTABLE AND DISPOSABLE LIVING-GRASS PET TOILET

(76) Inventor: Andrew Craghan Feld, Surfside, FL (US)

( * ) Notice: Subject to any disclaimer, the term of this patent is extended or adjusted under 35 U.S.C. 154(b) by 46 days.

(21) Appl. No.: 13/175,869

(22) Filed: Jul. 3, 2011

(65) Prior Publication Data

US 2012/0006274 A1 Jan. 12, 2012

Related U.S. Application Data

(60) Provisional application No. 61/361,554, filed on Jul. 6, 2010.

(51) Int. Cl.
*A01K 29/00* (2006.01)

(52) U.S. Cl.
USPC ............................ 119/168; 119/165; 119/171

(58) Field of Classification Search
USPC ................. 119/168, 165, 161, 167, 169, 170, 119/171
See application file for complete search history.

(56) References Cited

U.S. PATENT DOCUMENTS 2,671,427 A * 3/1954 Fell .............................. 119/166
2,876,588 A * 3/1959 Tietz et al. ................. 47/58.1 R
3,752,121 A * 8/1973 Brazzell ........................ 119/169
3,793,988 A * 2/1974 Traeger ......................... 119/164
4,190,981 A * 3/1980 Muldner ........................... 47/56
4,441,451 A * 4/1984 Neal ............................ 119/168
4,777,763 A 10/1988 Shannon et al.
5,134,974 A * 8/1992 Houser ......................... 119/168
5,224,292 A 7/1993 Anton
5,226,255 A 7/1993 Robertson
5,251,573 A * 10/1993 Bremley ...................... 119/168
5,482,007 A 1/1996 Kumlin
5,630,377 A * 5/1997 Kumlin ......................... 119/172
5,964,186 A * 10/1999 Koneke ........................ 119/169
6,065,601 A * 5/2000 Weder ........................... 206/457
6,079,363 A 6/2000 Maclaine
6,178,690 B1 1/2001 Yoshida et al.
6,219,965 B1 4/2001 Ishikawa et al.
6,237,285 B1 5/2001 Yoshida et al.
7,096,823 B1 * 8/2006 Smeltzer ...................... 119/166
7,434,539 B2 * 10/2008 Gloor ........................... 119/165
8,327,801 B1 * 12/2012 Tierney ........................ 119/165

(Continued)

OTHER PUBLICATIONS

Pooch Potty www.poochpotty.com, Jan. 7, 2007 [retrieved from internet Feb. 26, 2013], 6 pages.*

(Continued)

*Primary Examiner* — Andrea Valenti

(57) ABSTRACT

A portable, fully-disposable, pet toilet is comprised of a receptacle whose cavity is fitted with living grass, living sod (including washed or soil-free sod), or a grass-seed medium. The unit has a fitted, removable cover or fold-back lid to enable the convenient shipping and disposal of the unit in its entirety. The pet toilet is used by the pet for a set period of time, at which point it is completely disposed of and replaced with a new one.

3 Claims, 2 Drawing Sheets

13

12

10

11

(56) References Cited

U.S. PATENT DOCUMENTS

| | | | | |
|---|---|---|---|---|
| 2003/0145517 | A1* | 8/2003 | Miller | 47/57.6 |
| 2004/0011297 | A1* | 1/2004 | Hochman | 119/165 |
| 2004/0094445 | A1* | 5/2004 | Weder | 206/457 |
| 2005/0076563 | A1* | 4/2005 | Faris | 47/58.1 LS |
| 2005/0284392 | A1* | 12/2005 | Hillman | 119/169 |
| 2006/0236949 | A1 | 10/2006 | Hill et al. | |
| 2007/0163508 | A1* | 7/2007 | Gloor | 119/166 |
| 2008/0072833 | A1* | 3/2008 | Meeks et al. | 119/166 |
| 2008/0105208 | A1* | 5/2008 | Hamrick | 119/165 |
| 2008/0251026 | A1* | 10/2008 | Bell et al. | 119/168 |
| 2009/0178622 | A1 | 7/2009 | Havluciyan | |
| 2009/0305798 | A1 | 12/2009 | Harris | |
| 2010/0122662 | A1 | 5/2010 | Kennington | |
| 2010/0275853 | A1 | 11/2010 | Peterson | |
| 2011/0139082 | A1 | 6/2011 | Blagden | |

OTHER PUBLICATIONS

Pooch Potty www.poochpotty.com.
Doggy Solutions www.doggysolutions.com.
Pet Loo www.thepetloo.com
Potty Patch www.pottypatch.com.
Doggy and the City www.doggyandthecity.com.
Peta Potty www.petapotty.com.
Porch Potty www.porchpotty.com.
www.happydoggy.wordpress.com/2009/04/11/do-it-yourself-project-doggy-guess-box1.

* cited by examiner

PORTABLE AND DISPOSABLE LIVING-GRASS PET TOILET

CROSS-REFERENCE TO RELATED APPLICATIONS

This patent application claims the benefit of provisional patent application Ser. No. 61/361,554 filed on Jul. 6, 2010 by the present inventor.

BACKGROUND OF THE INVENTION

This invention relates generally to pet waste receptacles. More specifically, the invention constitutes a portable and fully-disposable receptacle that is impermeable to liquids and is fitted with living grass.

The portable and disposable living-grass pet toilet solves one of the most annoying and daunting problems faced by pet owners—dealing with a pet's bodily wastes. Owners who must leave their dogs unattended at home for long periods of time have few options for meeting their dog's elimination needs. Moreover, walking dogs in the rain or late at night are situations that most pet owners would like to avoid if at all possible for reasons of comfort and personal security. The limited mobility of older dog owners, as well as old or injured dogs, can also make dealing with pet waste a difficult issue. Individuals who live in apartment buildings can also find it inconvenient to walk their dogs frequently. To address these types of problems, others have proposed devices that allow dogs to relieve themselves indoors, as the need arises, without being taken on an outdoor walk by their owners. Examples include the following:

U.S. Pat. No. 3,752,121 to Brazzell discloses an animal toilet using synthetic grass and a disposable and absorbent pad for absorbing waste. The absorbent pad must be manually replaced and the synthetic grass cleaned and disinfected as bacteria will build up over time.

U.S. Pat. No. 1,0880,285 to Hillman discloses a rigid mesh screen atop a urine collection chamber. Urine collects at the base of the tray and is manually disposed of by the owner as needed.

U.S. Pat. No. 6,079,363 to MacLaine discloses a live grass mat that is supported by a permanent container that holds a reservoir of water. Over time, dog urine will kill the live grass, making it necessary to change out and replace the grass. This is often a messy and unpleasant job for the dog owner.

While these and similar types of devices provide a means to collect pet waste indoors, they suffer from a number of disadvantages. When a permanent, reusable container holds non-perishable materials (artificial grass or screens), the pet owner must periodically clean and/or disinfect the entire container, its base, and/or some of its permanent component parts to prevent odor and bacterial build-up. Alternatively, if a permanent, reusable container holds living grass, the grass must be changed out and replaced. When living grass is handled in this manner it can be an inconvenient, messy, and burdensome task.

In contrast, this invention is distinctively different from and more advantageous than other pet toilets in that it constitutes an integrated, fully-disposable unit, which is formed by fitting a disposable receptacle that is impermeable to liquids with living grass. The unit has no permanent base or non-perishable components, such as artificial grass or grates, which need to be cleaned and/or disinfected. The unit has no urine-filled parts that need to be removed from the permanent container and replaced. Instead, the integrated unit described herein is conveniently transported and disposed of, in its entirety. Convenience is a hallmark of this invention because there is no maintenance.

BRIEF SUMMARY OF THE INVENTION

The invention is a unit consisting of two main parts: (1) a fully-disposable integrated unit impermeable to liquids, and (2) a piece of living grass, living sod (including washed or soil-free sod), or a medium containing and germinating grass seeds, said grass being fitted within the unit's cavity. It is the integration of these elements into a fully-disposable and easy to ship unit that constitutes the invention.

A portable, fully-disposable in-door pet toilet is provided, which integrates several features into a single unit. It includes a receptacle made from or coated with an impermeable material. It has a plurality of sidewalls that rise from the base of the receptacle and connect to form an internal cavity into which a piece of living grass is fitted for the purpose of collecting the bodily waste of pets. It has a fitted, removable or fold-back cover that facilitates the unit's transport and disposability. The unit can be placed on a level surface—such as a floor—within a home, patio or balcony for convenient access by pets. Designed for delivery to customers at regular, specified intervals, the portable, fully-disposable, integrated unit does not require the emptying of catchment trays, or the cleaning and/or disinfection of any artificial components, or the replacement of any component parts. The integrated unit is designed to be delivered in its entirety and to be discarded in its entirety when the shipment of a new unit arrives.

BRIEF DESCRIPTION OF THE DRAWINGS

The features and advantages of this invention are better understood with regard to the following drawings. The drawings consist of the following.

DETAILED DESCRIPTION OF THE INVENTION

Figure 1:
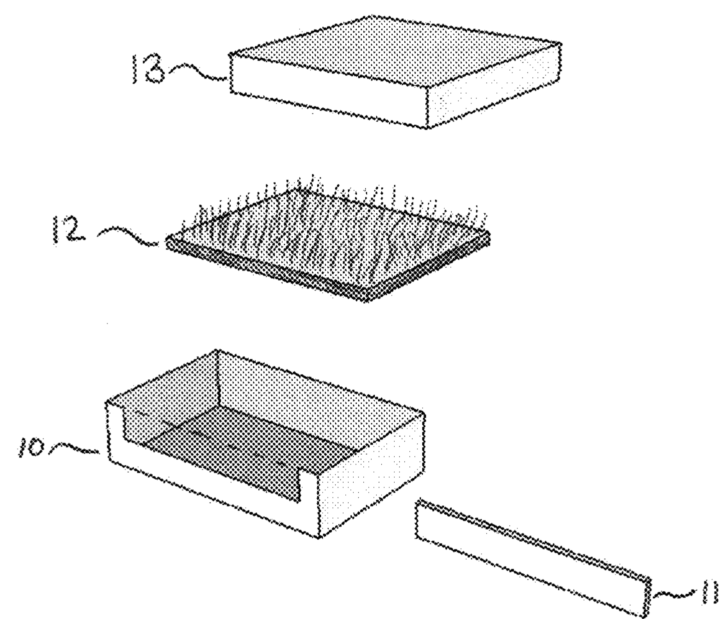
FIG. 1 provides three-dimensional side views with a slight diagonal perspective of the entire pet toilet and its removable parts.

As shown in FIG. 1, the living grass, 12 is fitted into the base of the unit 10, which has a fitted, removable lid 13. The base of the unit 10 may have one or more perforations that enable the removal of a piece of material from the side of the base 10 to provide an optional tear-out as shown by 11, or alternatively, an optional fold-down 11. The optional tear-outs or fold-downs can permit easy access to the grass for puppies and very small dogs.

Figure 2:
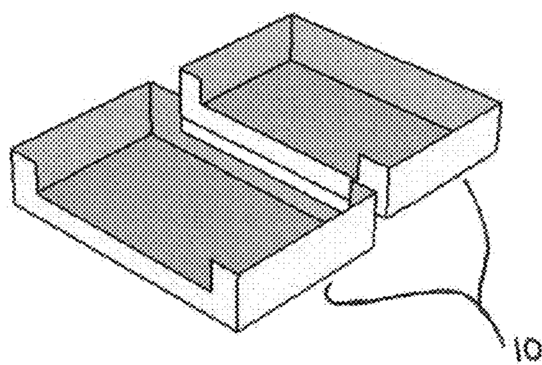
FIG. 2 is a three-dimensional side view, with a slight diagonal perspective, showing how the bases of two separate units can be joined together if optional perforations are removed and the bases are positioned so that they are abutting.

As shown in FIG. 2, these tear-outs can also be used to join together the bases of two or more units 10 to create a surface area for larger dogs. For this purpose, clips or other devices may be included to secure two or more units together.

In FIG. 1, the unit's base 10 and/or cover 13 are constructed of or coated with a material that is impermeable to liquids. Corrugated cardboard with a wax coating could be used for this specific purpose. The surface of the base of the unit 10 may have a coating or sealant comprised of vitamins and/or other nutrients or substances that will help prolong the life of the living grass.

In FIG. 1, the preferred shape of the unit's base 10 and cover 13 is shown as a rectangle; however, other shapes are possible. The removable cover 13 or parts of the base 10 may have holes or perforations to foster air circulation during transport. When the unit is at the pet's location, the cover 13 is removed or folded over to allow the pet entry into the unit. When the unit is ready for disposal, the cover 13 is again placed over the unit's base 10 to provide extra assurance that the individual handling the unit will avoid messy and unpleasant conditions during the disposal process. The fully integrated unit 10, 12, 13 is then disposed of in its entirety.

An odor or liquid absorbing material or substance may be used between the base of the unit 10 and the living grass 12. The living grass 12 may be treated with an insect repellent and/or an odor suppressant. It may be treated with a substance(s) that breaks down urine and fecal matter.

A substance may be used to adhere the bottom of the living grass 12 to the base of the unit 10 so that it remains in place during shipment.

There are different methods to increase the amount of living grass 12 that can fit inside a pet toilet container. Living grass 12 may be affixed to both the inside of the base 10 and inside of the lid 13, creating two separate toilets that can be combined to form a larger area. Alternatively, a different style container may be used. One such style is a suitcase box that can carry a piece of grass that is folded over or rolled up during shipment. In such a design, the lid would fold out to become part of the base that contains the grass.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The claimed invention is:

1. A pet toilet unit construction and continuous delivery and replacement method comprising the steps of:

constructing a pet toilet, wherein a single, integrated unit is created, said unit having: a receptacle made from, lined with, or coated with a liquid impermeable material, and a plurality of sidewalls that rise from a base of the receptacle and connect to form an internal cavity into which a piece of living grass is fitted for the purpose of collecting the bodily waste of a pet, and having a fitted cover that can be removed or folded back;

establishing a continuous delivery and replacement method for the continuous delivery and replacement of pet toilet units, each unit constructed in a manner substantially similar to the unit previously described, said delivery and replacement to occur at regular, specified intervals so as to continuously provide at least one customer with a new unit to replace a previously delivered unit;

wherein the unit is designed to both transport the living grass for initial use and to serve as a fully disposable pet commode;

wherein the unit has a fitted cover or fold-back lid to facilitate the convenient shipping and disposal of the unit in its entirety;

wherein the unit has one or more openings that enable air circulation in the unit in a state where the cover or lid is covering the receptacle base and keeping the living grass completely contained, wherein the continuous delivery and replacement method provides a self-contained unit that is delivered in its entirety and is replaced in its entirety when the shipment of a new unit arrives;

wherein the continuous delivery and replacement method maintains the freshness of the unit's living grass during shipment by the circulation of air;

wherein the continuous delivery and replacement method maintains the freshness of unit's living grass until the unit is discarded and replaced with a newly shipped unit; and wherein the continuous delivery and replacement method provides a unit that allows a pet's entry into the unit by the removal or folding down of the unit's cover.

2. The pet toilet unit construction and continuous delivery and replacement method according to claim 1, wherein each unit is delivered to at least one customer in its entirety and wherein it is suggested, recommended or advised to at least one customer that the previously delivered unit be discarded in its entirety when the shipment of a new unit arrives.

3. The pet toilet unit construction and continuous delivery and replacement method according to claim 1, wherein, to facilitate the disposal process, the unit's cover or lid may be removed upon delivery and retained during use for placement back on the unit's receptacle base at disposal time;

wherein there is no need to remove the soiled living grass, clean the unit, or put replacement grass into the unit;

wherein each unit has no permanent, reusable base, artificial grass or grates, or other non-perishable components, which need to be cleaned and/or disinfected;

wherein each unit does not require the emptying of urine catchment trays or other urine-filled parts, or their cleaning and/or disinfection.

* * * * *